United States Patent
Estevez et al.

(10) Patent No.: US 9,706,600 B2
(45) Date of Patent: Jul. 11, 2017

(54) CONNECTIONLESS WI-FI MESH COMMUNICATION

(71) Applicant: Texas Instruments Incorporated, Dallas, TX (US)

(72) Inventors: Leonardo William Estevez, Rowlett, TX (US); Gangadhar Burra, Plano, TX (US); Gustavo Gabriel Litovsky, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 236 days.

(21) Appl. No.: 13/931,267

(22) Filed: Jun. 28, 2013

(65) Prior Publication Data

US 2014/0003286 A1    Jan. 2, 2014

Related U.S. Application Data

(60) Provisional application No. 61/665,674, filed on Jun. 28, 2012.

(51) Int. Cl.
*H04W 84/18* (2009.01)
*H04W 48/02* (2009.01)

(52) U.S. Cl.
CPC ........... *H04W 84/18* (2013.01); *H04W 48/02* (2013.01)

(58) Field of Classification Search
CPC ...... H04W 84/18; H04W 84/12; H04W 48/20
USPC ......................... 370/254, 338, 311, 329, 235
See application file for complete search history.

(56) References Cited

U.S. PATENT DOCUMENTS

| | | | |
|---|---|---|---|
| 2007/0280180 A1* | 12/2007 | Dalmases et al. | 370/338 |
| 2008/0111699 A1* | 5/2008 | Kwon et al. | 340/601 |
| 2008/0170549 A1* | 7/2008 | Everson et al. | 370/338 |
| 2011/0149850 A1* | 6/2011 | Sashihara | 370/328 |
| 2013/0094441 A1* | 4/2013 | Milner | H04W 4/001 370/328 |
| 2013/0109313 A1* | 5/2013 | Kneckt et al. | 455/41.2 |

* cited by examiner

*Primary Examiner* — Jamal Javaid
(74) *Attorney, Agent, or Firm* — Ronald O. Neerings; Charles A. Brill; Frank D. Cimino

(57) ABSTRACT

System and method for communications in an ad-hoc multi-hop Wi-Fi network are disclosed. The MAC address of an intended recipient is propagated through an advertised SSID or probe response information element of multiple network participants. The group of network participants that convey the MAC address for the intended recipient are connect with each other as Wi-Fi Direct group owners connect to downstream Wi-Fi Direct clients. An access point may control when a Wi-Fi device is allowed to connect based upon whether or not the access point has data, commands, or information to be sent to the Wi-Fi device. If the access point has no data, commands, or information is ready to be sent to the Wi-Fi device, then the access point will add the Wi-Fi device to a list of excluded MAC addresses.

19 Claims, 4 Drawing Sheets

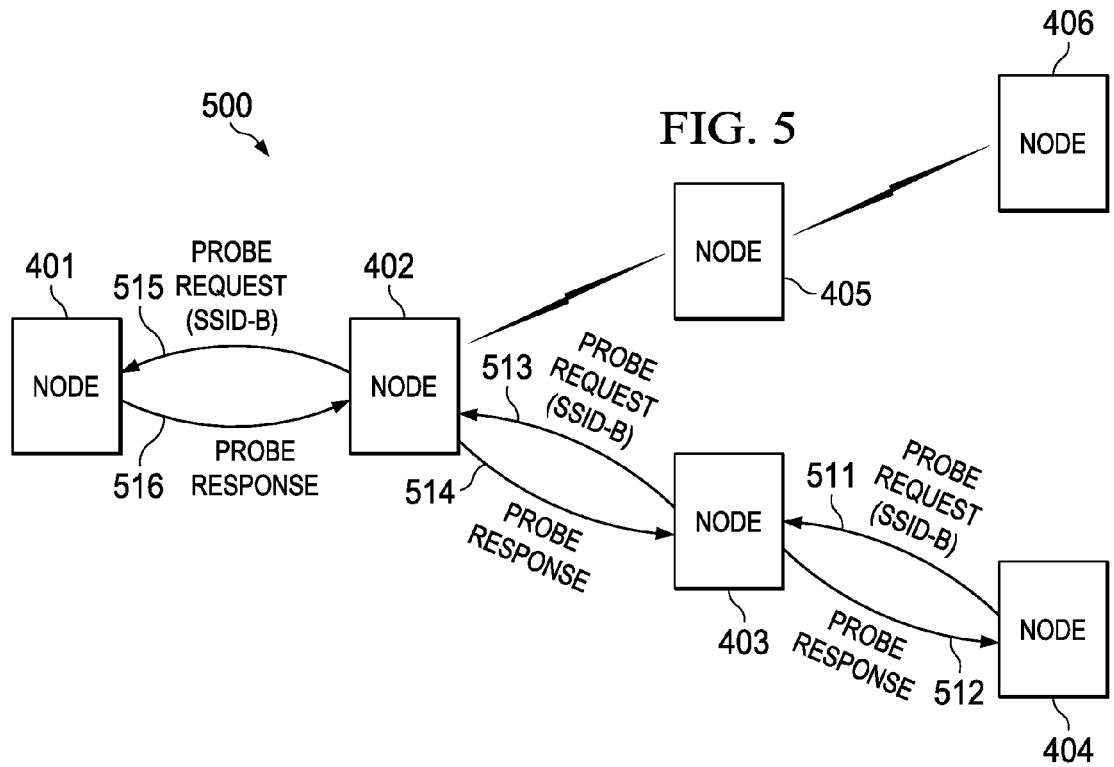
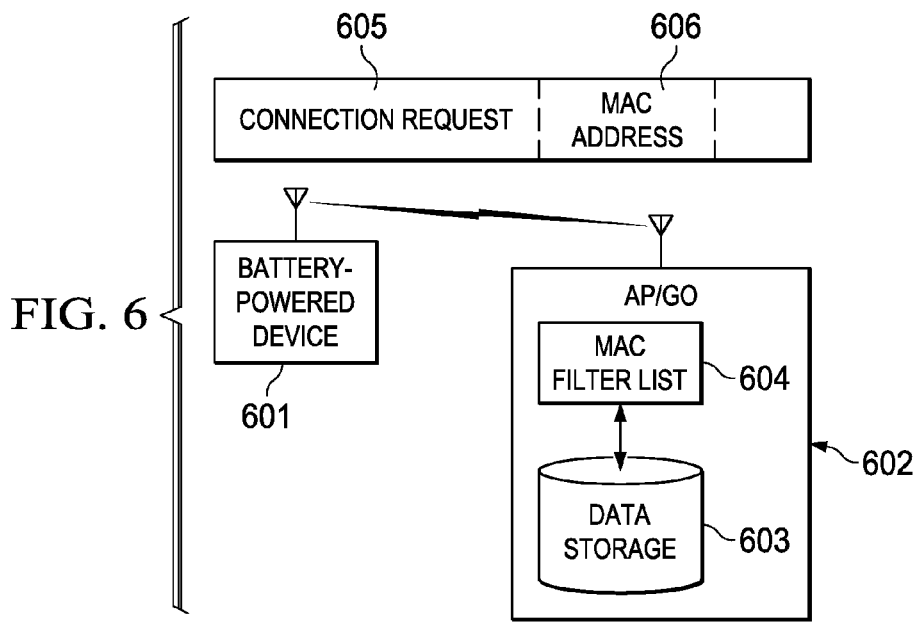

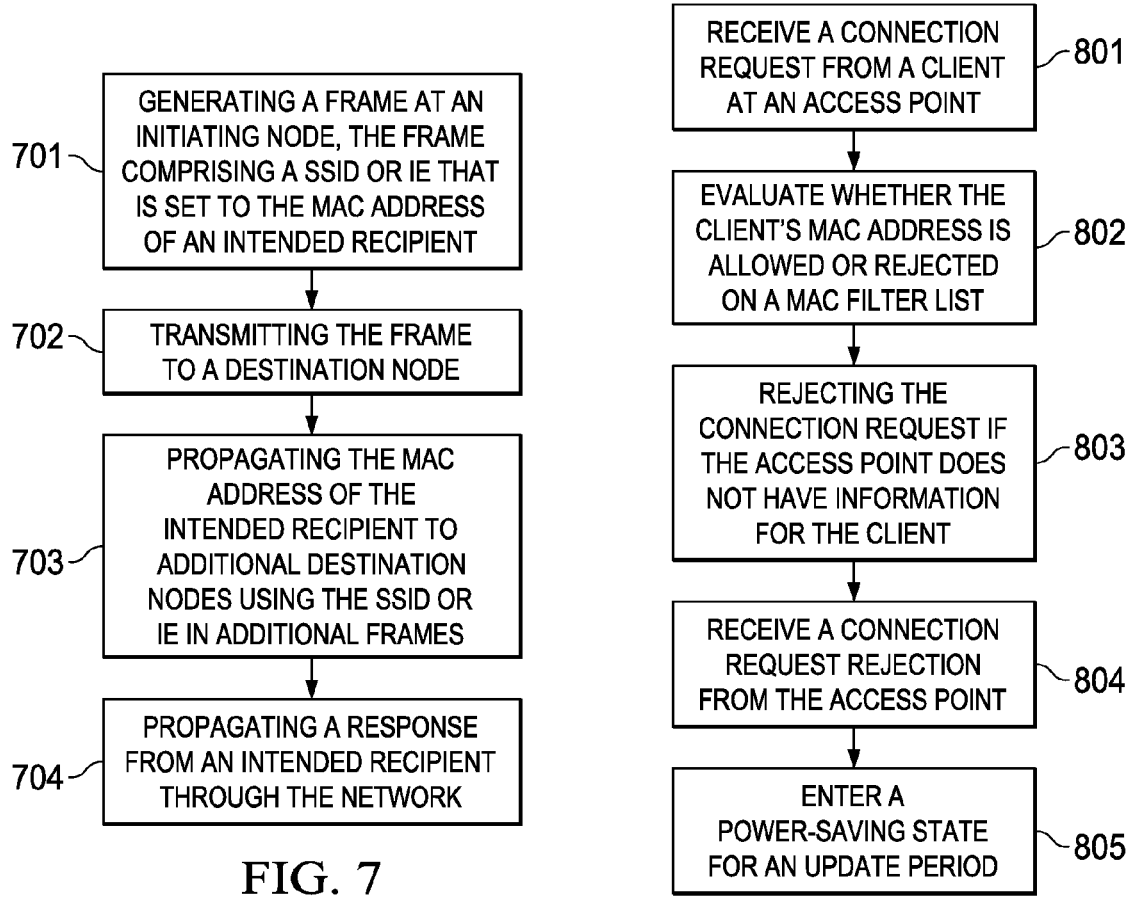
FIG. 7
FIG. 8
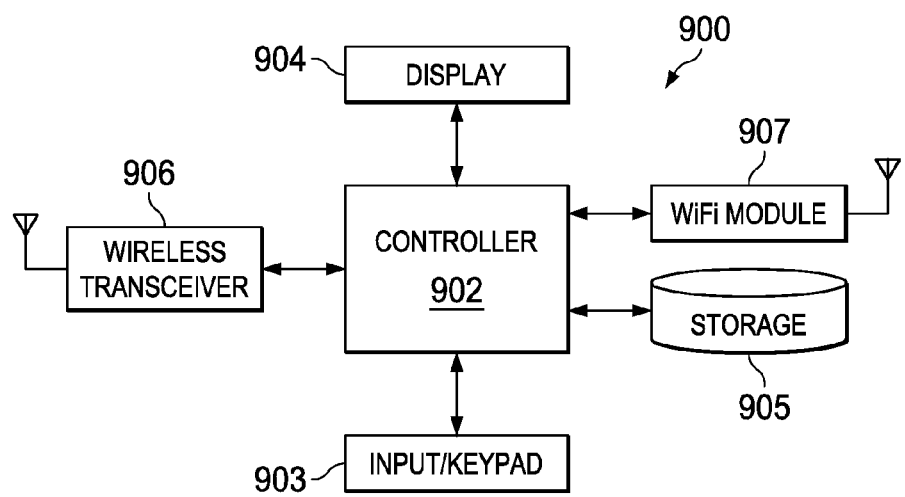
FIG. 9

CONNECTIONLESS WI-FI MESH COMMUNICATION

CROSS-REFERENCE TO RELATED APPLICATIONS

The present application claims the benefit of the filing date of pending U.S. provisional patent application No. 61/665,674, filed Jun. 28, 2012, the disclosure of which is hereby incorporated by reference herein in its entirety.

BACKGROUND

IEEE 802.11-based wireless networks (i.e., Wi-Fi networks) have traditionally required a dedicated router or access point (AP) for operation. Newer Wi-Fi Direct devices establish peer-to-peer groups that are functionally equivalent to traditional Wi-Fi infrastructure networks. Wi-Fi Direct supports one-to-one links between a pair of devices or one-to-multiple-device links among several devices. Using Wi-Fi Direct, a device can implement either the client or the AP role depending upon how the links are established. A single device may implement both the AP and client roles in separate Wi-Fi Direct networks. The device implementing AP-like functionality in a group is referred to as the Group Owner (GO) and the other devices in the group are Clients. The GO acts as a software-enabled AP (SoftAP).

When two Wi-Fi Direct devices discover each other they negotiate their roles (Client and GO) to establish a group. Once the group is established, other clients can join the group as in a traditional Wi-Fi network. A client can establish a second group with one or more additional Wi-Fi Direct devices that act as client's in the second group. This allows for extended mesh networks of nodes that are daisy-chained together by Wi-Fi Direct devices that alternate between the Client and GO roles in different groups.

Like a traditional AP, a Wi-Fi Direct GO announces itself through beacons to establish networks or groups with one or more clients. The Wi-Fi Direct GO may also cross-connect the clients in its group to an external network (e.g., provide an interface between clients and a 3G network or an infrastructure network).

Wi-Fi Direct does not allow devices to transfer the role of GO within a group. Accordingly, if the GO leaves the group, then the group is torn down and has to be re-established with a different device (e.g., a former client) taking the role of GO.

Group formation may be established as follows.

In a standard group formation case, the Wi-Fi Direct devices discover each other and then negotiate which device will act as GO. Wi-Fi Direct devices may perform a traditional active or passive Wi-Fi scan by which they can discover existent groups and Wi-Fi networks. After this scan, a Wi-Fi Direct device executes a discovery algorithm that alternates between two states: a search state, in which the device sends Probe Requests, and a listen state, in which the device listens for Probe Requests that it responds to with Probe Responses. Once the two devices have found each other, they start a GO Negotiation phase. This is implemented using a three-way handshake, namely GO Negotiation Request/Response/Confirmation, by which the devices agree which device will act as GO and which channel the group will use for communications. Once the devices have discovered each other and agreed on the respective roles, the next phase is the establishment of a secure communication.

In an autonomous group formation case, a device may autonomously create a group in which becomes the GO by sitting on a channel and starting to beacon. Other devices discover the established group using traditional scanning mechanisms. Compared to the standard case, the discovery phase is simplified in this case because the device establishing the group does not alternate between states and no GO Negotiation phase is required.

In a persistent group formation case, Wi-Fi Direct devices can declare a group as persistent, by using a flag in a capabilities attribute in Beacon frames, Probe Responses, and GO negotiation frames. Devices forming the group store network credentials and the assigned GO and client roles for subsequent re-instantiations of the group. Specifically, after the discovery phase, if a device recognizes that a persistent group has been formed with the corresponding peer in the past, either of the devices can use an invitation procedure to quickly re-instantiate the group by reusing stored credentials.

SUMMARY OF THE INVENTION

Embodiments of the invention provide systems and methods for communications in an ad-hoc multi-hop Wi-Fi network. The MAC address of an intended recipient is propagated through an advertised SSID or probe response information element of multiple network participants. The group of network participants that convey the MAC address for the intended recipient are connect with each other as Wi-Fi Direct group owners connect to downstream Wi-Fi Direct clients. Similarly, the Wi-Fi Direct clients connect to upstream Wi-Fi Direct group owners to convey a response from the intended recipient, wherein the most upstream connection is the initiator.

Network participants that are not among the group of devices that first convey a response from the intended recipient will stop advertising that intended recipient's MAC address via SSID or probe response information element in future messages. In other embodiments, an additional information element may be broadcast that indicates that all network participants should advertise the SSID or probe response information element may also be provided.

The network participants periodically wakeup to scan for SSID or probe response information elements that have previously resulted in connection with other network participants and only propagate those SSIDs. In other embodiments, network participants associated with an initiator-to-recipient network route will synchronize their probe requests by providing an additional information element in the advertised SSID or probe response which represents the duration (e.g., a number of milliseconds) that other network participants should wait before subsequent probe requests.

An initiator failing to receive a connection request from a network of participants previously associated with a recipient's network route may advertise another SSID or probe response information element indicating that all network participants should advertise the SSID or probe response information element.

Network participants may disconnect from each other as their upstream group owner (i.e., starting with the initiator node) disassociates them or stops advertising the SSID or probe response information element containing the intended recipient's MAC address.

In additional embodiments, an access point may control when a Wi-Fi device is allowed to connect based upon whether or not the access point has data, commands, or information to be sent to the Wi-Fi device. If the access point has no data, commands, or information is ready to be sent to the Wi-Fi device, then the access point will add the Wi-Fi device to a list of excluded MAC addresses. This will prevent the Wi-Fi device from wasting energy on transmissions (e.g., authentication, association, and data queries) when there is no data for the device.

BRIEF DESCRIPTION OF THE DRAWINGS

Figure 1:
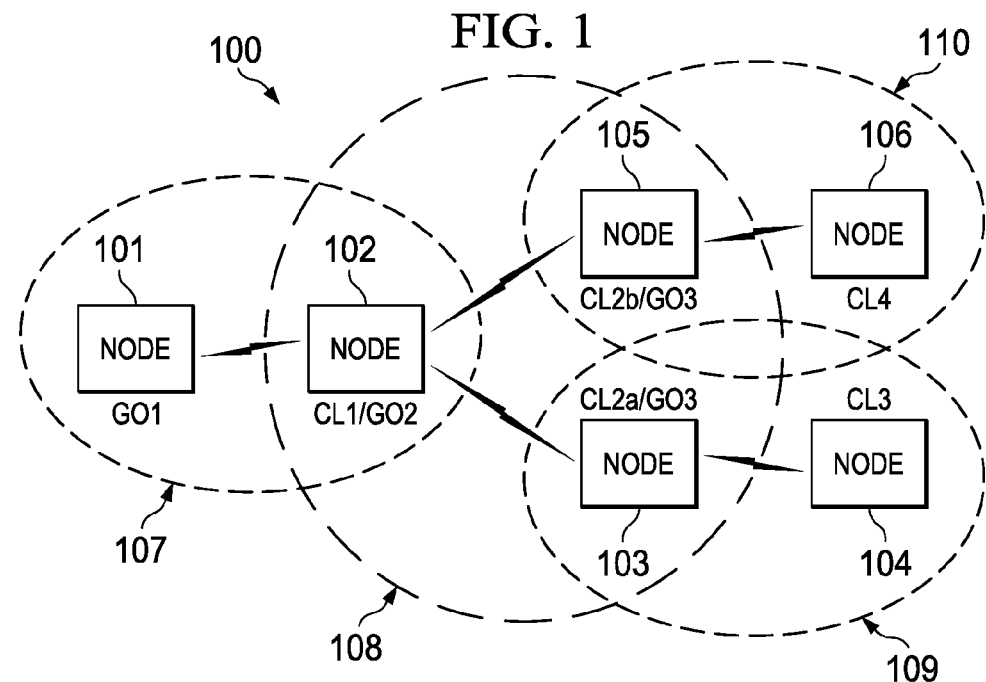

Having thus described the invention in general terms, reference will now be made to the accompanying drawings, wherein:

FIG. 1 is a block diagram illustrating a mesh network comprising nodes that are communicating with each other using a number of separate Wi-Fi Direct groups.

Figure 2:
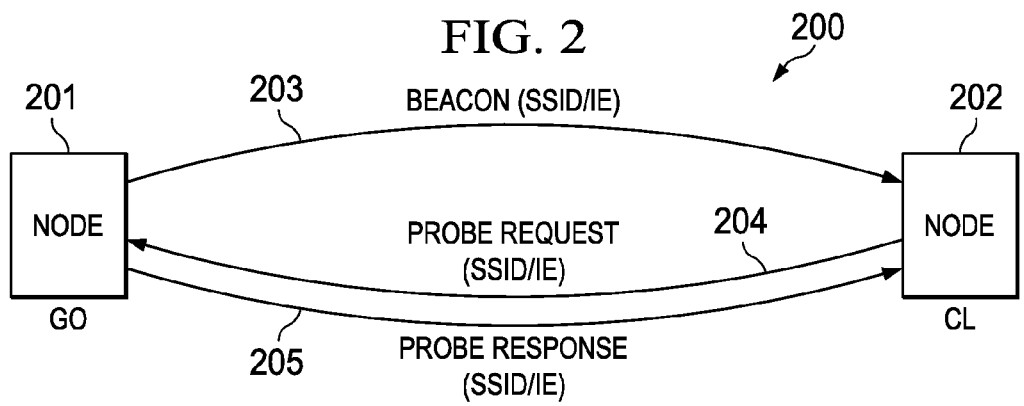

FIG. 2 is a block diagram illustrating a Wi-Fi Direct group formed by two nodes.

Figure 3:
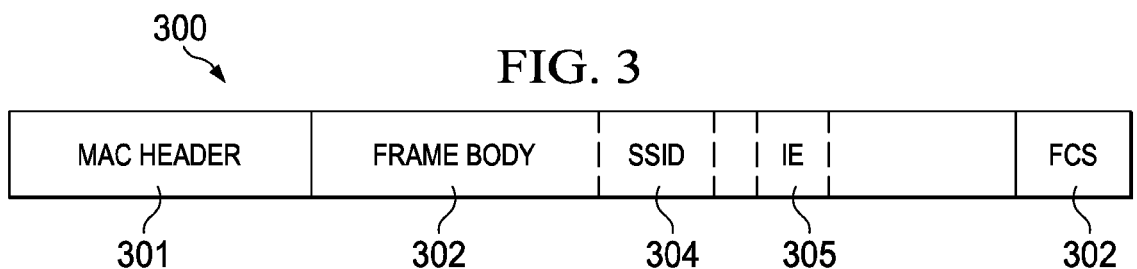

FIG. 3 illustrates an exemplary frame for carrying an SSID or IE according to one embodiment.

Figure 4A:
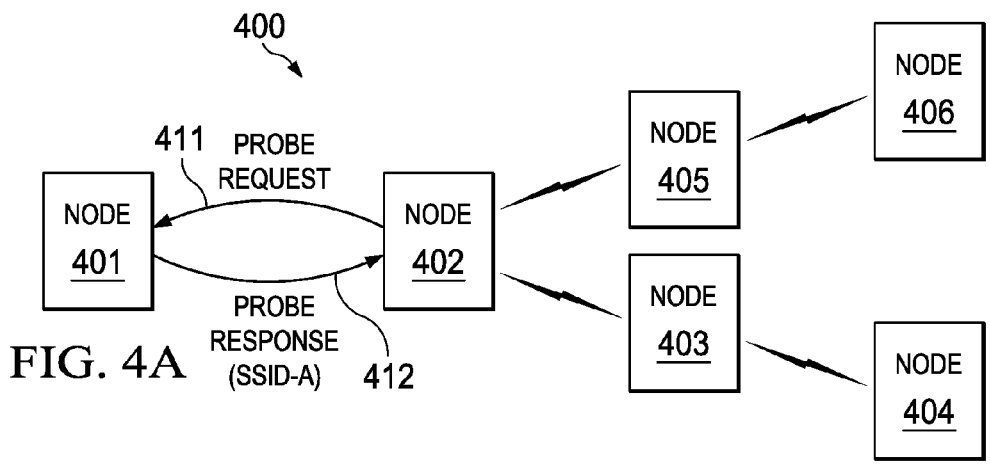
Figure 4B:
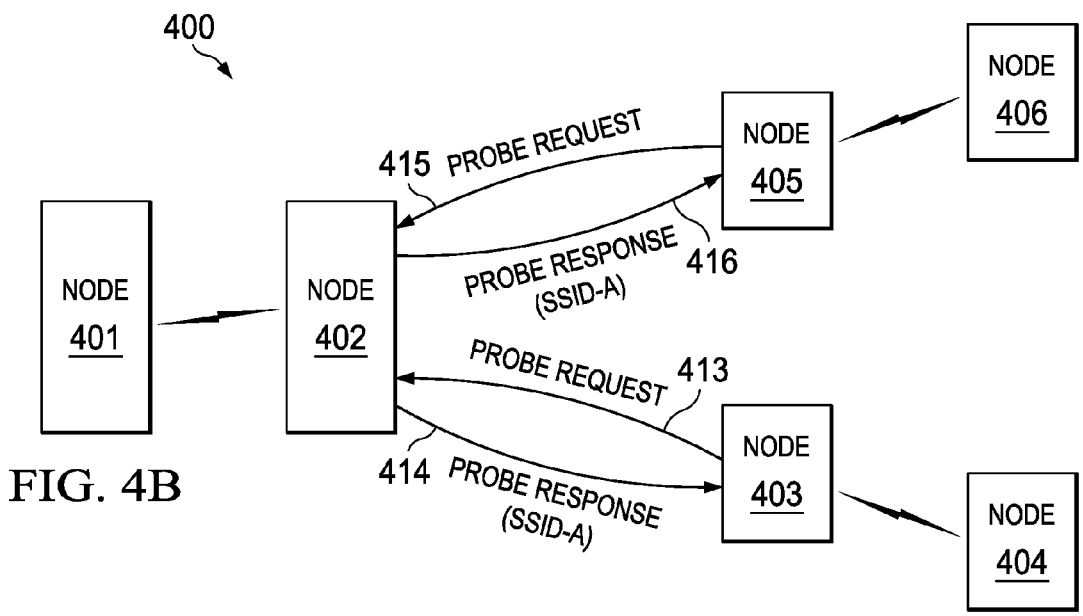
Figure 4C:
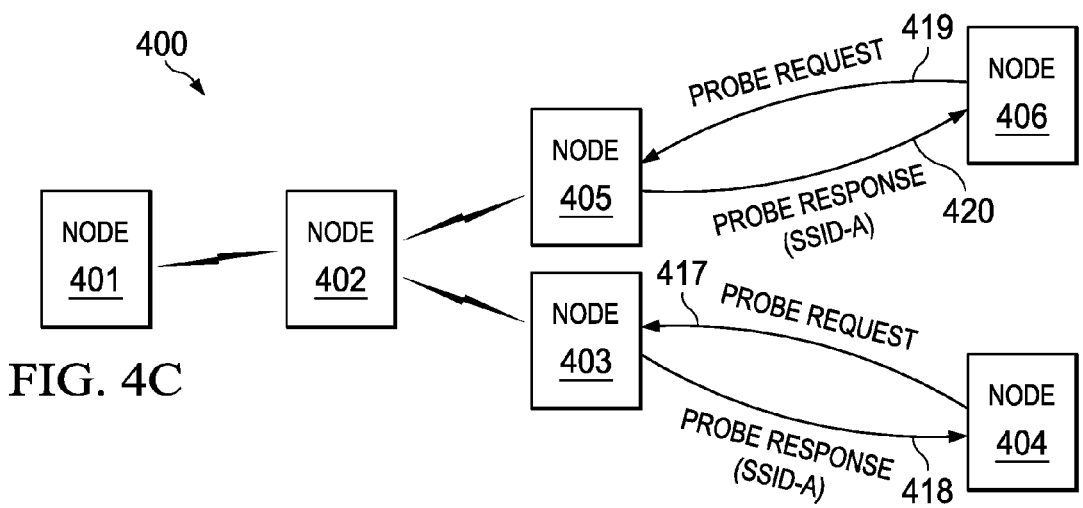

FIGS. 4A-4C illustrate the propagation of information though a mesh network over time.

FIG. 5 is a block diagram illustrating a response sent from a target node back to an initiating node using the SSID field.

FIG. 6 is a block diagram of a system for configuring MAC filters in an access point or group owner to improve battery usage in remote nodes.

FIG. 7 is a flowchart illustrating a communication in a multi-hop network according to one embodiment.

FIG. 8 is a flowchart illustrating a method for controlling client connections at an access point.

FIG. 9 is a block diagram of a Wi-Fi Direct device according to an embodiment of the invention.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating a mesh network 100 comprising nodes 101-106, which may be Wi-Fi Direct devices that are communicating with each other using a number of separate Wi-Fi Direct groups 107-110. In a first group 107, device 101 functions as the group owner (GO1) and device 102 is a client (CL1). Device 102 is also functioning as a group owner (GO2) for a second group 108 in which devices 103 and 105 are clients (CL2a, CL2b). Each client 103, 105 in the second group also functions as a group owner in additional groups 109 and 110. Device 103 operates as group owner (GO3) in a group 109 formed with client device 104 (CL3). Device 105 is the group owner (GO4) for a fourth group 110 in which device 106 is a client (CL4).

Devices 101-106 are nodes in the mesh network 100. Each device 101-106 may capture and disseminate its own data to other nodes. Additionally, each device 101-106 may also serve as a relay for other nodes to propagate data through the mesh network 100.

FIG. 2 is a block diagram illustrating a group 200 formed by nodes 201 and 202. Group 200 represents any of the groups 107-110 in FIG. 1. Node 201 is the group owner or SoftAP, and node 202 is the client in group 200. Node 201 transmits a beacon frame 203 at intervals defined for a Wi-Fi Direct GO or as appropriate for another peer-to-peer standard used by nodes 201 and 202. Such beacon frames 203 can be received by node 202 or by other devices that may attempt to join group 200. As will be recognized by those skilled in the art, the beacon frame 203 typically comprises some form of identifier for node 201, such as a Service Set IDentifier (SSID), and other data fields or information elements (IE). When node 202 detects device 201, such as by receiving beacon frame 203, computer-executable instructions executing on device 202 generate and transmit a probe request 204 to GO node 201. In one embodiment, probe requests are broadcast by device 202 such that any group owner or access point within communication range of device 202 can receive such probe requests. Upon receiving the probe request 204 from device 202, group owner 201 can respond with a probe response 205.

The transmission of the probe request 204 may be based on device 202 detecting group owner 201. In one embodiment, such detection can be based on receiving beacon frame 203. However, in other embodiments, device 202 can detect group owner 201 through other mechanisms separate and apart from the beacon frame 203. For example, device 202 may detect device 201 by receiving a probe response 205 that is sent by device 201 in response to a probe request that was sent by another device that is communicating with device 201. The probe request 204 and probe response 205 comprise data such as a group or network identifier (SSID) and information elements (IE) that can request or provide information. Typically, such information elements are reserved portions of an otherwise standardized request that can be utilized for transmitting an information payload.

In one embodiment, although not specifically illustrated FIG. 2, the group owner 201 may perform one or more checks prior to transmitting the probe response 205. For example, the group owner 201 can verify the integrity of the probe request 204, such as in a manner well known to those skilled in the art, and typically provided for by various communicational standards, to facilitate the communications described herein. As another example, the group owner 201 can also perform some check of device 202, such as, for example, verifying that device 202 is not on a blacklist, or otherwise not allowed to attempt to communicate with device 201. In such an embodiment, the probe request 204, provided by device 202 may comprise additional information, such as a Media Access Control (MAC) address or other identifier for device 202. This information may be used by the group owner 201 to verify that it can proceed with further communications with device 202.

In response to receiving the probe request 204, and assuming that any checks that were performed were deemed to have been acceptable, computer-executable instructions executing on device 201 can generate and transmit probe response 205 to device 202. In one embodiment, probe response 205 can provide an SSID and/or IE that can be part of a standardized probe response structure and which provide the mechanism by which the probe response structure can be utilized to convey data.

A client can get information about nearby wireless networks in two ways: passive scanning or active scanning. The client may use both passive scanning and active scanning to get information about surrounding wireless networks.

In active scanning, a client actively sends a probe request frame during scanning, and gets network signals in received probe response frames. The client sends a probe request with no SSID (i.e., the length of the SSID information element is 0). The client broadcasts a probe request frame on each of the supported channels to scan wireless networks. GOs that receive the probe request frame send a probe response frame. The client associates with the GO with the strongest signal. This active scanning mode enables a client to know the available wireless services and then access the target wireless network.

With passive scanning, a client gets wireless network information by listening to Beacon frames sent by surrounding group owners. Passive scanning is used by clients to discover surrounding wireless networks and groups through listening to the beacon frames periodically sent by a GO. All GOs providing wireless services periodically send beacons frames, so that clients can periodically listen to beacon frames on the supported channels to get information about surrounding groups. Passive scanning can be used by a client when it wants to save battery power.

FIG. 3 illustrates an exemplary frame 300 according to one embodiment. The frame 300 can comprise a Media Access Control (MAC) header 301, a frame body 302, and a Frame Check Sequence (FCS) 303 or other like data utilized to verify the integrity of the overall frame 300. The MAC header 301 may comprise source and destination MAC addresses as well as other information regarding the communication process. The frame body 302 contains fields such as a timestamp, SSID 304, IEs 305, and other elements.

Frame 300 may conform to communication protocol standards (i.e., IEEE 802.11 standards) and may represent a beacon frame, probe request frame, or probe response frame. The communicational protocol standards provide for the location and content of the SSID 304 and IEs 305 in the frame body 302.

Referring again to FIG. 1, mesh network 100 may comprise a network of battery-powered devices, such as sensor modules for wireless data collection, measurement, and control. Such sensors may be used in home, office, and industrial applications, such as home automation, security, inventory tracking, and the like. Battery-powered wireless sensors are freely movable allowing installations that eliminate cabling requirements, such as deployment on moving machines, vehicles, or instruments, or deployments in temporary locations. Devices deployed in a random or unplanned network may establish a mesh network using Wi-Fi Direct, for example, to exchange data and control information.

Battery-powered devices are sensitive to the amount of energy consumed for power-hungry operations such as RF transmissions between nodes 101-106. Accordingly, in a mesh network of battery-powered devices, the nodes should minimize RF transmissions as much as possible to save power. However, the nodes cannot completely shut down their communications. The nodes must exchange control instructions, sensor data, and other information at certain intervals or they will not provide a useful service.

In mesh network 100, node 101 may act as a controller that directs the operation of sensor nodes 102-106 and collects information from those nodes. In one embodiment, the nodes may use probe request/probe response messages to provide secure communications in order to transmit sensor information to other devices. Using the probe request/probe response messages to exchange information minimizes the number and duration of RF transmissions required because the nodes do not need to fully connect to the network to exchange frames.

In one embodiment, information may be securely transmitted over a Wi-Fi mesh network to sensors or other controller polling devices with minimal power using SSID and IE fields in existing Wi-Fi standard messages. Information may be propagated from one device to another in the mesh network using the IEs and SSID fields in beacon frames and probe response frames, for example. Additionally, MAC filtering can be used to prune mesh routing. Route-specific scan synchronization can also be supported using these frames.

FIGS. 4A-4C illustrate the propagation of information though a mesh network 400 over time. FIG. 4A is a block diagram illustrating nodes 401-406 in mesh network 400 exchanging probe request and probe response frames according to one embodiment. Node 402 sends a probe request frame 411 to node 401. Node 401 and node 402 may already be part of an established group with node 401 as the GO, or node 402 maybe attempting to form a group. In response, node 401 sends probe response frame 412 to node 401. Response frame 412 includes information in the appropriate SSID field for the probe response frame 412. In the example of FIGS. 4A-4C, the particular value of the SSID field is shown as "SSID-A" to designate a unique value. In an alternative embodiment, the SSID-A information may be carried in an IE or other field within probe response frame 412.

In a standard Wi-Fi Direct group, node 402 would proceed to establish a group with node 401 or would exchange additional information. In embodiments of the present invention, however, SSID-A contains information that can be used by node 402 without requiring further communication with node 401. For example, SSID-A may indicate a desired state or other command directed to node 402 or to another node in mesh network 400.

FIG. 4B is a block diagram illustrating the exchange of probe request and probe response frames between devices in a second group. Nodes 403 and 405 send probe request frames 413 and 415 to node 402. The probe request frames 413, 415 may be sent at different times, but both are shown in FIG. 4B at the same time for simplification of the drawings. Nodes 402, 403, and 405 may already be part of an established group with node 402 as the GO, or nodes 403 and/or 405 maybe attempting to form a group with node 402.

In response to the probe request frames, node 401 sends probe response frame 414 to node 403 and sends probe response frame 416 to node 405. Probe response frames 414 and 416 both include the information SSID-A in the appropriate SSID or IE field for the probe response frame. Node 402 uses the most recently received SSID information (i.e., SSID-A) received from node 401 when generating the probe response frames 414 and 416. In this way, the content of SSID-A can be propagated from node 401 to nodes 402, 403, and 405.

FIG. 4C is a block diagram illustrating the exchange of probe request and probe response frames between devices in additional groups. Nodes 404 and 406 send probe request frames 417 and 419 to nodes 403 and 405, respectively. The probe request frames 417, 419 may be sent at different times, but both are shown in FIG. 4C at the same time for simplification of the drawings. Nodes 403 and 404 and nodes 405 and 406 may already be part of established groups, or they may be attempting to form new groups.

In response to the probe request frame 417, node 403 sends probe response frame 418 to node 404. Similarly, node 405 sends probe response frame 420 to node 406. Probe response frames 418 and 420 both include the information SSID-A in the appropriate SSID or IE field for the probe response frame. Nodes 403 and 405 use the most recently received SSID information (i.e., SSID-A) received from node 402 when generating the probe response frames 418 and 420. In this way, the content of SSID-A can be propagated from node 401 through nodes 402, 403, and 405 all the way to nodes 404 and 406.

In a Wi-Fi network, the SSID may be up to 32 octets long. In one embodiment, the content of SSID-A comprises one or more of a group code, an intended recipient MAC address, a routing code, and a synchronization timestamp. The intended MAC address (or another identifier in SSID-A) corresponds to one of nodes 402-406. When the node corresponding to the MAC address (i.e., a target node) receives a probe response frame that includes SSID-A, that node will respond according to the content of SSID-A.

In this way, the target node does not need to exchange further messages with it group owner or with other nodes in mesh network 400. Instead, using an agreed-upon format of the SSID content, the target takes the action designated by the SSID. For example, if the target node is a sensor, then the SSID content may include commands that direct the node to report measurements, adjust a measurement cycle, adjust a sleep cycle, turn on/off, activate/deactivate an associated device, disconnect from the network, or take other action.

In another embodiment, the SSID may be propagated through the system using a beacon frame instead of using a probe response frame. Each node that acts as both client and GO in a group within the mesh network will propagate the SSID information received from its group owner or other upstream node.

FIG. 5 is a block diagram illustrating a response (i.e., SSID-B) sent from a target node (i.e., node 404) back to an initiating node using the SSID field. In the example of FIGS. 4A-4C, node 401 initiated instructions using the information "SSID-A." The MAC header in SSID-A corresponds, for example, to node 404. When target node 404 receives a probe response 418 with SSID-A, it takes the appropriate action. Node 404 may then return an acknowledgement or other information formatted as SSID-B for the SSID field in a series of probe request messages 511, 513, 515 sent through nodes 403 and 402.

After taking the appropriate action directed by SSID-A, node 404 sends a probe request frame with SSID-B. Node 403 recognizes the format of SSID-B or knows that the SSID field of a more remote node should be passed upstream toward initiating node 401. Accordingly, node 403 acknowledges probe request frame 511 in probe response frame 512. The next time node 403 sends its own probe request frame 513 to node 402, it includes SSID-B. Similarly, node 402 acknowledges the probe request frame 513 in probe response 514. When node 402 next sends a probe request frame 515 to node 401, it includes SSID-B which informs initiating node 401 that target node 404 received the instructions and/or indicates what action was taken.

It will be understood that the probe request frames and probe response frames shown in FIG. 5 appear to occur at the same time to simplify the drawing. However, there is likely a delay between transmission times for corresponding probe request frames and probe response frames and between transmission times of probe requests by different nodes.

Security credentials for connecting each client to its group owner may be shared using standard Wi-Fi Direct mechanisms, such as Wi-Fi Protected Setup (WPS) Push button Configuration (PBC). Credentials may be shared among network participants for a given group IE. Layer 3 (L3) encryption may be used to make information visible only between initiators and recipients (e.g., nodes 401 and 404 only). L3 authentication mechanisms may be used to prevent MAC address spoofing.

Route pruning may be used to improve future routing of messages from an initiating node to a target node. For example, in the example of FIG. 5, nodes 405 and 406 did not participate in propagating a response message from the target node. In view of this, nodes 405, 406 do not appear to be in the path from the initiating node 401 and target node 404. Therefore, those nodes may ignore future messages destined for target node 404. This may be accomplished, for example, by ignoring future SSIDs that include the MAC address used in in SSID-A. Accordingly, when node 405 later receives an SSID with the MAC address for node 404, it would not propagate the SSID any further. This allows nodes 405, 406 to save power by not forwarding information on an unused path.

Nodes in the mesh network may save additional power by synchronizing their probe request and listening timing. When a client receives a probe response frame from its upstream group owner, the response includes a timestamp that indicates how long the group owner had been listening for a probe request. The client may reset the phase of its periodic probe requests to enable it to receive a group owner response immediately after the group owner is activated to listen for probe request frames. This allows the nodes to minimize activation time and latency based upon a common probe request period.

Nodes in the mesh network may use a store and forward operation to further reduce power consumption. In cases where power saving is more important than latency concerns, for example, the nodes may store received SSID information, but not forward that information until probed by a client node. The node may disconnect from a client once the information is passed. This arrangement would also work for unidirectional applications, such as control applications, where the group owner node is not expecting a response from a client or from other downstream nodes.

MAC filtering may also be used to minimize power consumption in some embodiments. MAC addresses layer 2 addresses are uniquely assigned to each device. MAC filtering is often used as a security access control method wherein the MAC address assigned to each device is used to determine access to the network. MAC filtering on a network determines if a node is permitted or denied network access. Blacklists (unwanted addresses) and whitelists (acceptable addresses) may be used to determine which MAC addresses should be filtered. Although typically used as security too, intelligent MAC filtering may be used to reduce transmissions in a network.

Wi-Fi devices schedule a periodic wakeup from a sleep state to determine whether it should obtain data from a connected server or device. The processes of authentication, association, and subsequent data queries can require relatively large power expenditures for battery-powered Wi-Fi devices. These transmissions are particularly wasteful when the battery-powered device completes a connection to another device only to find that there is no data to be transferred—that is the connect was not needed. In existing systems, there is no way for a Wi-Fi device to determine whether another device has data for it without connecting to the other device.

In one embodiment, a Wi-Fi access point or group owner may use MAC filtering to signal whether a remote device should connect to retrieve data without requiring the device to periodically authenticate, associate, and query a remote server.

FIG. 6 is a block diagram of a system for configuring MAC filters in an access point or group owner to improve battery usage in remote nodes. A battery-powered device 601, such as a Wi-Fi node, may establish communication with an access point or group owner 602, which may operate as a controller server for device 601. To save battery power, device 601 may alternate between sleep and wake states, wherein functions are minimized during the sleep state to conserve power. Device 601 periodically enters an awake state and polls its access point or server 602 for data.

Access point 602 stores data for remote devices, including device 601, in a memory store 603. Access point 602 may maintain a list of devices that need to receive or download data from memory store 603.

Access point 602 may also maintain a MAC filter list 604 of allowed devices (whitelist) or restricted devices (blacklist) that is uses to determine whether to allow connections. In one embodiment, MAC filter list may be modified based upon the content of data storage 603 and/or whether or not access point 602 has information to send device 601.

If access point 602 has data or other information for device 601, then the MAC address of device 601 may be added to (whitelist) or removed from (blacklist) the MAC filter list 604. Similarly, when access point 602 does not need to communicate with device 601 because it has no data for device 601 in storage 603, for example, then the MAC address of device 601 may be removed (whitelist) or added to (blacklist) the MAC filter list 604.

When device 601 next attempts to connect with access point 602, it will send a connection request frame 605 (or other appropriate initial connection frame as defined by the wireless standard used by device 601 and access point 602). The connection request frame 605 includes the MAC address 606 of device 601, which may be, for example, the source address of the frame. Access point 602 receives the connection request frame 605, extracts device 601's MAC address 606, and compares it to the MAC filter list 604. If device 601's MAC address is explicitly allowed (whitelist) or is not a rejected address (blacklist), then access point 602 will allow device 601 to continue the processes of authentication, association, and subsequent data queries to retrieve any existing information.

Alternatively, if device 601's MAC address is explicitly rejected (blacklist) or is not an allowed address (whitelist), then access point 602 will not allow device 601 to continue connecting. Instead, access point 602 will immediately rejection device 601's connection attempt. This will save device 601 from expending power to make transmissions for authentication, association, and data queries when access point 602 knows upfront that there is no data for device 601 to retrieve. It will be understood that a device 601 is added to or deleted from the MAC filter list 604 depending upon whether or not access point 602 has data or information to send to device 601.

The inclusion of device 601's MAC address in access point 602's MAC filter list 604 is not dependent on security issues. Device 601 may be rejected by access point 602 at time when there is not data for device 601 in storage 603; however, device 601 may be allowed to connect at a later time when access point 602 has data for device 601.

As illustrated in FIG. 6, MAC filtering may be used to save battery-power by reducing or eliminating unneeded RF transmissions when there is no data to download. MAC filtering may also be used for route pruning in a mesh network.

FIG. 7 is a flowchart illustrating a communication in a multi-hop network according to one embodiment. In step 701, a frame is generated at an initiating node. The frame comprises an SSID or IE field that has been set to a MAC address of an intended recipient. In some embodiments, the SSID or IE further comprises a command for the intended recipient.

In step 702, the frame is transmitted to a destination node in the multi-hop network, which may be a mesh network consisting of by a plurality of nodes forming two or more inter-linked Wi-Fi Direct groups.

In step 703, the MAC address of the intended recipient is propagated through the multi-hop network by transmitting additional frames with the SSID or IE. The additional frames may be sent from group owners to clients in the Wi-Fi Direct groups. The Wi-Fi Direct groups may be inter-linked, for example, by nodes that function as a client in a first group and a group owner in a second group.

In step 704, a response is propagated from the intended recipient through the multi-hop network, such as from clients to group owners in the Wi-Fi Direct groups.

In other embodiments, a node of the multi-hop network may determine whether or not it propagated a response from the intended recipient. If a node did not propagate the response, then it will stop generating frames with the intended recipient's MAC address in the non-address data field.

Nodes may periodically wake-up to scan for frames for SSID or IE fields that have previously resulted in connection with other network nodes and will propagate such frames to other network nodes. A frame may further comprise an additional information element that indicates when all network participants should forward the non-address data field.

The frame may be used to synchronize transmission of probe requests by network nodes that are associated with a recipient network route using an additional IE in a probe response. The additional IE can represent a duration that other network participants should wait before subsequent probe requests.

When an initiator fails to receive a connection request from a network of participants that previously were associated with the intended recipient's network route, the initiating nodes may generate a second frame comprising an SSID or IE that indicates that all network nodes should advertise the MAC address of the intended recipient.

FIG. 8 is a flowchart illustrating a method for controlling client connections at an access point. In step 801, an access point receives a connection request from a client. In step 802, the access point evaluates whether the client's MAC address is allowed or rejected on a MAC address filter list. The MAC address is allowed, for example, if the access point has information for the client. In step 803, the connection request is rejected if the access point does not have information for the client.

The information for the client may be a state change. The client's MAC address is rejected when the access point does not have a state change for the client, for example.

In step 804, the client receives a connection request rejection from the access point. The client then enters a power-saving state at the client for an update period in step 805. The access point may reject the connection request before the client initiates an authentication process to save the power required for additional transmissions associated with the authentication process, for example.

FIG. 9 is a block diagram of a Wi-Fi Direct device 901 according to an embodiment of the invention. In example embodiments, device 901 may be a mobile terminal, such as a video phone, cell phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., notebook computers, tablet computers, etc.), digital cameras, portable gaming device, or any battery-powered portable electronic device.

Device 901 may comprise a controller 902 that controls the overall operation of device 901. Controller 902 may switch and control operation of device 901 depending on user inputs received through an input unit 903 or display 904.

Input unit 903 may include alphanumeric keys needed to input numeric and text information and function keys needed to set various functions, or may include a touch pad. Display 904 may include a Liquid Crystal Display (LCD) or a Light Emitting Diode (LED) device that outputs various display information generated by device 901 and controller 902. When a display 904 has a capacitive or resistive touch screen, display 904 may operate as an input unit for controlling device 901. In such a case, input unit 903 may include a minimum number of predetermined keys, and the display 904 may partially replace the key input function of the key input unit 903. Input unit 903 may also include an audio processor or a coder/decoder (codec) (not shown) for processing audio signals, such as voice and multimedia files.

A memory 905 may include program memory and/or data memory. Program memory stores programs for controlling the overall operation of device 901. Data memory may store information collected during the operation of the device. Memory 905 may further comprise internal and/or external memory, such as Hard Disk Drive (HDD), Solid State Disk (SSD), Compact Flash (CF), Secure Digital (SD), Micro Secure Digital (Micro-SD), Mini Secure Digital (Mini-SD), Extreme Digital (xD), memory stick, and the like.

Wireless transceiver 906 includes a Radio Frequency (RF) unit (not shown) that includes an RF transmitter for up-converting a frequency of transmission signals and amplifying the up-converted transmission signals, and an RF receiver for low-noise-amplifying received signals and down-converting a frequency of the amplified signals. Wireless transceiver 906 may also include a modulator/demodulator (modem) (not shown) that includes a transmitter for coding and modulating transmission signals and a receiver for demodulating and decoding signals received from the RF unit.

Wi-Fi module 907 provides short-range wireless communication operations based on the IEEE 802.11 standard. Using Wi-Fi module 907, device 901 may form or join Wi-Fi Direct Groups. Wi-Fi module 907 supports data exchange with other Wi-Fi Direct devices in a Group. The controller 902 acquires device information for other Wi-Fi Direct devices to form a Wi-Fi Direct Group by means of Wi-Fi module 907.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for communication in a multi-hop network of nodes, comprising:
    generating a frame at an initiating node, the frame comprising a non-address data field that is set to a Media Access Control (MAC) address of an intended recipient, wherein the non-address data field is defined in a protocol standard to carry information other than an address;
    transmitting the frame to a destination node;
    periodically waking the initiating node and scanning for frames with non-address data fields that have previously resulted in connections with other network nodes; and
    propagating the frames identified via the scanning as having non-address fields that have resulted in connections.

2. The method of claim 1, wherein the non-address data field is a Service Set IDentifier (SSID) or an information element (IE).

3. The method of claim 1, wherein the multi-hop network is a mesh network.

4. The method of claim 1, wherein the non-address data field further comprises a command for the intended recipient.

5. The method of claim 1, wherein the frame is a beacon frame and the non-address data field is a Service Set IDentifier (SSID) in the beacon frame or the frame is a probe response frame and the non-address data field is an information element (IE).

6. The method of claim 1, wherein the multi-hop network is formed by a plurality of nodes forming two or more inter-linked Wi-Fi Direct groups, the method further comprising:
    propagating the MAC address of the intended recipient through the multi-hop network by transmitting frames with the non-address data field from group owners to clients in the Wi-Fi Direct groups, wherein the groups are inter-linked by nodes that function as a client in a first group and a group owner in a second group.

7. The method of claim 6, further comprising:
    propagating a response from the intended recipient through the multi-hop network from clients to group owners in the Wi-Fi Direct groups.

8. The method of claim 1, further comprising:
    determining whether a node of the multi-hop network propagated a response from the intended recipient; and
    if no response has been propagated, stop generating frames with the intended recipient's MAC address in the non-address data field.

9. The method of claim 1, wherein the frame further comprises an additional information element that indicates when all network participants should forward the non-address data field.

10. The method of claim 6, wherein the frame is a probe response frame and the non-address data field is an information element (IE), the method further comprising:
    synchronizing transmission of probe requests by network nodes associated with a recipient network route using an additional IE in the probe response, the additional IE representing a duration that other network participants should wait before subsequent probe requests.

11. The method of claim 6, further comprising:
    determining when an initiator fails to receive a connection request from a network of participants previously associated with the intended recipient's network route; and
    generating a second frame at the initiating node, the second frame comprising a non-address data field that indicates that all network nodes should advertise the MAC address of the intended recipient.

12. A device for communicating in a Wi-Fi network, comprising:

a controller configured to create a frame comprising an advertised Service Set IDentifier (SSID) or probe response Information Element (IE) that corresponds to a Media Access Control (MAC) address of an intended recipient;

a Wi-Fi module configured to propagate the frame to one or more participants in the Wi-Fi network;

the controller further configured to periodically wake the device to scan for frames with non-address data fields that previously resulted in connections with other network nodes; and the Wi-Fi module further configured to propagate the frames identified as having non-address fields that previously resulted in connections.

13. The device of claim 12, wherein the SSID or IE further comprises an instruction for the intended recipient.

14. The device of claim 13, wherein the instruction identifies a desired operating state for the intended recipient.

15. The device of claim 12, further comprising:
a Wi-Fi module configured to receive the SSID or IE from an access point or group owner, the SSID or IE used to create a frame transmitted to a client device.

16. The device of claim 12, wherein the network is formed by a plurality of nodes forming two or more inter-linked Wi-Fi Direct groups and wherein the Wi-Fi module is further configure to propagate the MAC address of the intended recipient through the multi-hop network by transmitting frames with the non-address data field from group owners to clients in the Wi-Fi Direct groups, wherein the groups are inter-linked by nodes that function as a client in a first group and a group owner in a second group.

17. The device of claim 16, wherein the Wi-Fi module is further configured to propagate a response from the intended recipient through the multi-hop network from clients to group owners in the Wi-Fi Direct groups.

18. The device of claim 12, wherein the controller is further configured to determine whether a node of the network has propagated a response from the intended recipient; and, if no response has been propagated, stop generating frames with the intended recipient's MAC address in the non-address data field.

19. The device of claim 12, wherein the created frame further comprises an additional information element that indicates when all network participants should forward the non-address data field.

* * * * *